United States Patent [19]

Jacobson

[11] Patent Number: 5,340,393
[45] Date of Patent: Aug. 23, 1994

[54] PROCESS FOR PREPARING SILICA COATED INORGANIC PARTICLES

[75] Inventor: Howard W. Jacobson, Wilmington, Del.

[73] Assignee: E. I. Du Pont de Nemours and Company, Wilmington, Del.

[21] Appl. No.: 137,903

[22] Filed: Oct. 12, 1993

Related U.S. Application Data

[63] Continuation of Ser. No. 874,878, Apr. 28, 1992, abandoned.

[51] Int. Cl.[5] .................................................. C09C 1/36
[52] U.S. Cl. .................................... 106/492; 106/442; 106/444; 106/446
[58] Field of Search ............... 106/492, 444, 482, 446, 106/417, 456

[56] References Cited

U.S. PATENT DOCUMENTS

| Re. 27,818 | 11/1973 | Werner | 106/300 |
| 2,885,366 | 5/1959 | Iler | 252/313 |
| 5,041,162 | 8/1991 | Brand | 106/446 |
| 5,071,676 | 12/1991 | Jacobson | 427/214 |

FOREIGN PATENT DOCUMENTS

| 0359569 | 3/1990 | European Pat. Off. . |
| 0393857 | 10/1990 | European Pat. Off. . |
| 2740561 | 3/1978 | Fed. Rep. of Germany . |
| 60-226805 | 11/1985 | Japan . |
| WO8909801 | 10/1989 | PCT Int'l Appl. . |
| 2042574 | 9/1980 | United Kingdom . |

*Primary Examiner*—Karl Group
*Assistant Examiner*—Chris Gallo

[57] ABSTRACT

An improved process for preparing non-agglomerated water insoluble inorganic particles having a dense amorphous silica coating by using a dispersion aid.

8 Claims, No Drawings

PROCESS FOR PREPARING SILICA COATED INORGANIC PARTICLES

This is a continuation of application Ser. No. 07/874,878 filed Apr. 28, 1992, now abandoned.

BACKGROUND OF THE INVENTION

The present invention relates to an improved process for preparing non-agglomerated water insoluble inorganic particles having a dense amorphous silica coating by using a dispersion aid.

U.S. Pat. No. 2,885,366 describes several methods for applying a dense silica coating to substrate particles, i.e., core particles by suspending the particles in water and then coating with active silica while maintaining the pH in the range of 7 to 11. If the substrate particles in the suspension are in some degree aggregated together to form clumps or agglomerates these are coated with a layer of dense amorphous silica as well as any primary substrate particles. Such a product embraces a wide distribution of sizes of silica coated substrates. Although the coated agglomerates can be broken down into smaller fragments, by milling or sonification, the fragmented agglomerates have exposed surfaces which are not coated with silica. This detracts from the performance of these materials in many applications, e.g., rough surface appearance in films such as paints.

U.S. Pat. Re. No. 27,818 describes this problem for silica coated titanium dioxide pigments. The solution offered in that reference was treating a suspension of silica coated titanium dioxide with an aqueous solution of a water soluble aluminum compound. Paints made using this pigment gave smoother films.

The use of dispersion aids for initially preparing non-agglomerated aqueous suspensions of particulate substrates is known in the art. There is no previous mention, however, of using suitable dispersion aids in the silica coating process to minimize particle agglomeration and give a more uniform particulate product which has been accomplished by the present invention. The products produced by the present improved process have shown particle size improvement and superior performance such as decreased surface roughness when used as pigments in film formers, e.g., paints.

SUMMARY OF THE INVENTION

This invention relates to an improved process for applying a dense amorphous silica coating to water insoluble inorganic core particles, particularly oxides. The improvement comprises adding a dispersion aid to an agitated aqueous suspension of the core particles followed by deposition of a silica coating. Dispersion aids contemplated for use in the process are ammonium and alkali metal salts or acids of multicharged anions such as phosphate, pyrophosphate and citrate which, when they are adsorbed on the surface of the core particles, prevent agglomeration by conferring a charge on the particles. Other dispersion aids have large molecular organic components, which inhibit particle agglomeration sterically by coating the surface of particles. Examples of such dispersion aids are the alkali metal salts of fatty acids such as laurates, palmitates, stearates and oleates. The process of the invention comprises the steps of forming an aqueous suspension of the particles to be silica coated, adding a dispersion aid and heating with agitation to a temperature in the range of 60° C. to 100° C. Then an alkali silicate solution is added and the pH is maintained in the range of 7 to 11 by the simultaneous addition of mineral acid. Stirring is continued at 60° C. to 100° C. and a coating of amorphous silica is deposited on the surface of the dispersed core particles. The product is separated, washed free from ions and dried. The product consists of non-aggregated, i.e., non-agglomerated particles which are completely coated with a dense layer of amorphous silica, the silica component of the coated composition being between 0.5 and 50 percent by weight.

The process is particularly useful for the preparation of improved titanium dioxide pigments having high opacity and outstanding ease of dispersibility in liquid coating compositions, as described in U.S. Pat. Re. No. 27,818. Paints made with the finished pigments have excellent smoothness and outstanding durability upon outdoor exposure. The preparation of electroconductive powders (ECP) described in co-pending U.S. patent application Ser. No. 07/386,765 (which corresponds to European Patent Application Publication No. 0 359 569) requires, as a preliminary step, the application of a dense silica coating to a water insoluble inorganic core particle. The process of the present invention can be used for this purpose by subsequently applying a coating layer consisting essentially of hydrous oxides of antimony and tin to the silica coated particles and then calcining at a temperature in the range of from 400° C. to 900° C. Various economic advantages are realized by the process of the invention and a decreased amount of silica in the coating applied by the process of the invention gives a final product (ECP) that has a reduced particle size distribution. This results in an electroconductive paint system that has reduced roughness, a most desirable attribute.

DETAILED DESCRIPTION OF THE INVENTION

The invention relates to an improved process for preparing dense amorphous silica coated water insoluble inorganic particles, particularly oxides. The improvement comprises adding a dispersion aid to an agitated aqueous suspension of the core particles followed by deposition of a silica coating. The process of this invention comprises the steps of:

(a) preparing an agitated aqueous suspension of water insoluble core particles; and 0.05 to 2 wt % based on the core particles of a dispersion aid selected from the group consisting of a charge stabilizer and a steric stabilizer at a temperature of 60° C. to 100° C.;

(b) adding concurrently an alkali metal silicate and a mineral acid and maintaining the pH in the range of 7 to 11 while depositing 0.5 to 50 wt % of amorphous silica on the surface of the core particles;

(c) separating and washing the silica coated inorganic particles to remove water soluble species;

(d) drying and recovering dense amorphous silica coated inorganic particles.

An optional surfactant, such as triethanolamine, may be added in step (a).

The process can be used to apply a dense amorphous silica coating to a wide variety of inorganic particulate materials. Suitable core compositions must be insoluble in water in the pH range of 7 to 11. Inorganic oxide powders are preferred such as oxides of titanium, magnesium, calcium, barium, strontium, zinc, tin, nickel and iron. The process is also applicable to applying silica coatings to complex oxides such as mica, cordierite, enorthite and pyrophyllite. The most preferred inorganic particles are titanium dioxide pigment particles, which when coated with a dense skin of silica are useful in making greatly improved paints, enamels and lacquers as described in U.S. Pat. Re. No. 27,818. In addition to oxides, insoluble carbonates or sulfates such as calcium, barium and strontium may be used as core particles in the process of the invention.

The average diameter of suitable core particles ranges from submicron to tens of microns and is preferably in the range 0.1 to 20 microns. In the case of titanium dioxide, the range is 0.1 to 1 micron. The nitrogen surface area of core particles which can be used in the process is between 0.1 to 50 $m^2/g$, most commonly between 2 and 20 $m^2/g$. In general, the preferred surface area will be in the lower part of the above range for high density materials and in the higher part of the above range for low density materials. Particles shapes which are contemplated for use in this invention may vary widely, e.g., spherical particles, rods, whiskers, fibers, needles, and platelets. It will be appreciated that the shape of the core particles used depends primarily on the intended application of the silica coated product. Acicular particles are generally preferred for use in paint films, and equiaxial shaped particles are generally preferred for use as filler in plastics. Other factors such as smoothness of the conducting film and optional properties may lead to a different preference in a specific application and may readily be selected by one skilled in the art.

Dispersion aids useful in the process of the invention fall into two categories depending on the mechanism of stabilization of the particle surface which inhibits aggregation, i.e., (a) charge stabilization; and (b) steric stabilization.

Charge stabilization is achieved by the use of metal salts or acids of multicharged anions. Ammonium and alkali metal phosphates, polyphosphates and citrates are particularly effective when used in the process. Potassium salts are preferred because of their ease of solubility and since the larger cation has little tendency to coagulate the silica coated particles, whereas sodium and ammonium cations have a greater flocculating effect. In the case of steric stabilization, the dispersion aids have bulky molecular components which inhibit aggregation of the particles by coating their surface. Suitable dispersion aids of this type are the alkali metal salts of organic fatty acids such as laurates, palmitates, stearates, oleates and the like. The amount of dispersion aid employed is 0.05 to 2 wt % based on the core material. The compositions which are useful as dispersion aids must not interfere with the silica coating process.

The use of dispersion aids decreases particle agglomeration thus reducing the viscosity of the particulate core suspension and enables the present process to be operated at lower temperatures and at higher solids concentrations, thus providing economic benefits and permitting savings on equipment. The more highly dispersed particles require less silica to give an effective coating and when they are used as pigments the resulting films show improvements in smoothness and reflectance. When used to make ECP compositions the low aggregation of the particles and the decreased amount of silica in the coating leads to a final product ECP having a reduced particle size distribution. When such an ECP composition is used in an electroconductive paint system the dried film has excellent smoothness. In addition, to the economic advantages of operating at higher capacity, the process enables complete coatings to be achieved with less silica than is required when dispersion aids are not used.

In practicing the invention, an aqueous suspension is prepared, comprising a desired core material, a dispersion aid and optionally a small amount, e.g., 0.1 to 0.5% of a surfactant, such as triethanolamine. Active silica is then added while maintaining the pH of the suspension at a value in the range of 7 to 11. Active silica is very low molecular weight silica, such as silicic acid or polysilicic acid, which may be added as such to the suspension, or formed in situ as by the continuous reaction of an acid with an alkali silicate. This background is described in greater detail in U.S. Pat. No. 2,885,366, the teachings of which are incorporated herein by reference. Potassium silicate is generally preferred since the potassium ion has little tendency to coagulate active silica. The bulk commodity is also more stable, which is advantageous from the standpoint of shipping and storing.

The concentration of core material in the dispersion is not especially critical. It can range from 100 to 600 g/liter. The amount of dispersion aid added is in the range 0.05 to 2 wt % based on the core material. Having prepared a dispersion of the core material the agitated dispersion is heated to between 60° C. to 100° C. and the uniformly dispersed particles are then coated with a dense film or skin of amorphous silica around the individual particles. The silica content of the coated composition is between 0.5 and 50 wt % and most commonly between 0.5 to 25 wt %.

During silica deposition it is desirable to maintain substantially uniform conditions in the reaction zone to minimize precipitation of free silica gel. This is best accomplished by maintaining good agitation and introducing the reactants in a manner which does not allow local over concentration. The pH is monitored continuously and is maintained within the range 7 to 11 preferably 7 to 10 throughout the mixing step. The pH is allowed to fall gradually to about 7 as the process is completed and the slurry is usually then cured to permit completion of the deposition of the silica onto the surface of the core particles. The curing step comprises holding the slurry at temperatures between 60° C. to 100° C., preferably 75° and 90° C., from 30 minutes to four hours, preferably about one hour, while maintaining the pH of the agitated slurry between 6.0 and 7.5.

The product is then separated as a silica coated powder, by filtration or centrifugation, combined with aqueous washing to remove soluble salts. A vacuum rotary-type filter is particularly suitable since washing can be carried out without removing the product from the filter. Washing is continued until the filtrate is quite free of ions. The washed product can then be dried in an air or vacuum oven. A preferred commercial method of drying the product is spray drying with either heated air or superheated steam, preferably at temperatures below 450° C.

The recovered product is useful in a variety of applications. For example, silica coated titanium dioxide prepared by the process of this invention is a high opacity pigment with outstanding ease of dispersibility in liquid coating composition. Paints containing this pigment have excellent smoothness and outstanding durability upon outdoor exposure. The product can also be modified for other uses. Silica coated particles are particularly useful for making improved ECP compositions of the kind described in copending U.S. patent application Ser. Nos. 07/386,765 and 07/631,108. It is preferred, however, to use a dispersion of silica coated particles prepared in situ for this purpose rather than recovering the dry product and re-dispersing this powder prior to applying the additional coatings described in the processes of the above mentioned U.S. Patent Applications. By whichever procedure they are made the resulting products give exceptionally smooth electroconductive paint films. In addition they possess very good electroconductive properties at low pigment binder ratios as described in greater detail in the Examples.

Silica coated particles prepared by the method of this invention were used to make ECP. The powders were analyzed by X-ray fluorescence analysis and the dry powder resistance was measured by the procedure described in U.S. patent application Ser. No. 07/386,765, the teachings of which are incorporated herein by reference.

The ECP was formulated with a test paint carrier and the surface conductivity of the dry paint film was measured using the method described in U.S. patent application Ser. No. 07/386,765. The surface roughness of the dry paint film was measured in microinches, using a Hobson-Taylor Surtronic 3P surface roughness tester as supplied by G. F. Maier Co., Edgemont, Pa.

This invention is described in greater detail in the following examples which should not be construed as limiting in any way the scope of the invention.

EXAMPLES

Example 1

This example describes the preparation of an ECP consisting of a titanium dioxide particle coated with silica and an outer coating of antimony containing tin oxide, the ratio of $SnO_2$ to Sb in the outer coating being about 10 to 1. Sodium pyrophosphate is used as a dispersion aid and the silica coating thickness is about half that of the standard ECP silica coating described in U.S. patent application Ser. No. 07/386,765.

To 2.5 liters of deionized water heated to 75° C. in a four liter beaker, were added, with agitation, 2 g of triethanolamine, 188 g of pigment grade $TiO_2$ powder and 2 g of sodium pyrophosphate, $Na_4P_2O_7$. The pH of the suspension was brought to 10.0 by the addition of 20% NaOH. 25 g of a stock solution of $K_2SiO_3$, having an $SiO_2/K_2O$ molar ratio 3.29 and containing 26.5 wt % $SiO_2$, was added over a period of two minutes. 20% HCl was then added over a two hour period to lower the pH to 8.0. The pH was lowered to 7.0 using 20% HCl and the agitated suspension was cured for 30 minutes at 75° C. The pH was then lowered to 2.0 using 20% HCl and 220 g of calcium chloride was dissolved in the aqueous suspension.

Next, an aqueous solution of $SnCl_4$, $SbCl_3$ and HCl was prepared by combining 202 ml of an aqueous $SnCl_4$ solution, containing the equivalent of 0.445 g. $SnO_2$/ml, with 38.4 ml of an aqueous concentrated HCl solution of $SbCl_3$, containing the equivalent of 0.267 g Sb/ml. This corresponded to a weight ratio of 7.60 parts of $SnO_2$ to 1 part of Sb in the solution. This solution was then added to the well agitated suspension over a period of two hours concurrently with the addition of sufficient 20% NaOH to maintain the pH of the suspension at 2.0. The suspension was then cured by digesting for half an hour at pH 2.0 and 75° C. with continuous agitation.

The solids were recovered by filtration, washed with deionized water until free from chloride ion and dried by heating at 120° C. for several hours. The recovery of dried powder was 291.1 g and the surface area was found to be 56.9 $m^2/g$. The dried powder was calcined in air at 750° C. for 2 hours. The surface area of the calcined product was 26.1 $m^2/g$. The calcined powder resistance was 8 ohms. By x-ray fluorescence analysis the powder contained, 60.3% $TiO_2$; 2.2% $SiO_2$; 31.1% $SnO_2$ and 3.7% $Sb_2O_3$. This corresponds to a weight ratio of 10.1 parts of $SnO_2$ to 1 part of Sb. The crystallite size was found to be 79 Angstroms by X-ray diffraction analysis.

The particle size distribution and average particle diameter were determined using a Microtrac II Standard Range Particle Size Analyzer. 0.8 g of the powder was dispersed by agitation in 80 ml of deionized water containing 15 drops of a surfactant, Darvan C, (R. T. Vanderbilt Co.). Three small samples of the dispersion were analyzed and the average of the particle size distributions showed 81% of the particles to be between 2.6 and 7.5 microns, with an average particle diameter of 3.46 microns.

The powder was formulated with a test paint carrier at pigment binder ratios of 35/100 and 40/100 and applied to test surfaces. The resulting dry paint films exhibited surface conductivities of 150 and >165 Ransburg units respectively and in both cases the surface roughness was only 6 microinches.

Example 2

This example describes the preparation of a similar composition to that described in example 1 using citric acid instead of sodium pyrophosphate as a dispersion aid. No triethanolamine was added.

To 3 liters of deionized water heated to 90° C. in a four liter beaker, were added, with agitation 188 g of pigment grade $TiO_2$ powder and 2 g of citric acid. The procedure was then as described in Example 1, the only difference being that the temperature of the suspension was 90° C.

The surface area of the dried powder was 60.8 $m^2/g$ and of the calcined powder 30.3 $m^2/g$. The calcined powder resistance was 22 ohms. By X-ray fluorescence analysis the powder contained 60.6% $TiO_2$; 2.3% $SiO_2$; 30.9% $SnO_2$ and 3.6% $Sb_2O_3$. This corresponded to a weight ratio of 10.3 parts of $SnO_2$ to 1 part of Sb. The crystallite size was found to be 68 Angstroms by X-ray diffraction analysis.

Determination of the particle size distribution showed 80% of the particles to be between 1.7 and 5.3 microns, with an average particle diameter of 2.70 microns.

The powder was formulated with a test paint carrier at a pigment binder ratio of 50/100 and applied to a test surface. The resulting dry paint film exhibited a surface conductivity of 145 Ransburg units and the surface roughness was only 5 microinches.

Comparative Example

This is a comparative example to illustrate the effect on the characteristics of the product by eliminating the dispersion aid in the process.

The procedure described in Example 2 was repeated except the amount of $K_2SiO_3$ stock solution used was 50 g and the dispersion aid, citric acid, was not added to the TiO₂ suspension.

The surface area of the dried powder was 38.6 m²/g and of the calcined powder 22.0 m²/g. By X-ray fluorescence analysis the powder contained 60.3% $TiO_2$; 4.4% $SiO_2$; 29.2% $SnO_2$ and 3.6% $Sb_2O_3$. This corresponds to a weight ratio of 9.7 parts of $SnO_2$ to 1 part Sb. The crystallite size was 84 Angstroms, by X-ray diffraction analysis.

Determination of the particle size distribution showed 83% of the particles to be between 3.7 and 14.9 microns, with an average particle diameter of 7.85 microns. Thus the product obtained when a dispersion aid was not used in the process consisted of particles that were considerably larger than those obtained by the procedure described in Example, 2 which incorporated a dispersion aid.

The powder was formulated with a test paint carrier at a pigment binder ratio of 50/100 and applied to a test surface. The resulting dry paint film exhibited a surface conductivity of 95 Ransburg units and the surface roughness was 42 microinches, much greater than the 5 microinches measured for a paint film made using the product of Example 2. The surface conductivity was also less when the powder was used at the same pigment to binder ratio as the product of Example 2.

I claim:

1. A method for preparing dense amorphous silica coated inorganic particles comprising the steps of:
   (a) preparing an aqueous suspension of water insoluble core particles selected from the group consisting of mica, cordierite, enorthite, pyrophyllite; and oxides of magnesium, calcium, barium, strontium, zinc, tin, nickel and iron; and carbonates and sulfates of calcium, barium and strontium, with an optional surfactant, and 0.05 to 2 wt % based on the core particles of a dispersion aid comprising a steric stabilizer at a temperature of 60° C. to 100° C.;
   (b) adding an alkali silicate and a mineral acid and maintaining the pH in the range of 7 to 11 while depositing 0.5 to 50 wt % of amorphous silica on the surface of the core particles;
   (c) separating and washing the silica coated inorganic particles to remove water soluble species; and
   (d) drying and recovering dense amorphous silica coated inorganic particles.

2. A method for preparing dense amorphous silica coated titanium oxide particles comprising the steps of:
   (a) preparing an aqueous suspension comprising water insoluble titanium oxide core particles with an optional surfactant, and a dispersion aid comprising a steric stabilizer at a temperature of 60° C. to 100° C.;
   (b) adding an alkali silicate and a mineral acid and maintaining the pH in the range of 7 to 11 while depositing 0.5 to 50 wt. % of amorphous silica on the surface of the core particles;
   (c) recovering dense amorphous silica coated titanium oxide particles.

3. A method for preparing an amorphous silica coated pigment comprising the steps of:
   (a) preparing an aqueous suspension of inorganic core particles, which are insoluble in water in the pH range of 7 to 11, with an optional surfactant, and a dispersion aid comprising a steric stabilizer at a temperature of 60° C. to 100° C.;
   (b) adding concurrently active silica and a mineral acid, and maintaining the pH in the range of 7 to 11 while depositing amorphous silica on the surface of the core particles without precipitating free silica gel;
   (c) recovering amorphous silica coated pigment particles.

4. The method of claims 1, 2 or 3 wherein a coating of 0.5 to 25 wt % amorphous silica is deposited.

5. The method of claims 1, 2 or 3 wherein the steric stabilizer is an alkali metal salt of organic fatty acids.

6. The method of claim 1 wherein the core particles is barium sulfate and after step (b), further comprises the steps of:
   (e) applying a coating layer consisting essentially of hydrous oxides of antimony and tin to the silica coated particles;
   (f) calcining the coated particles at a temperature in the range of from 400° C. to 900° C.

7. The method of claim 2 or claim 3 wherein after step (b), the method further comprises the steps of:
   (d) applying a coating layer consisting essentially of hydrous oxides of antimony and tin to the silica coated particles;
   (e) calcining the coated particles at a temperature in the range of from 400° C. to 900° C.

8. The method of claim 7 wherein at least 80% of the recovered particles have a particle size which ranges between about 1.7 and 5.3 microns.

* * * * *